(12) United States Patent
Dubell et al.

(10) Patent No.: US 7,736,101 B2
(45) Date of Patent: Jun. 15, 2010

(54) GUIDED ROTARY FILE

(75) Inventors: Richard E. Dubell, Loveland, OH (US); Timothy L. Manning, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/202,287

(22) Filed: Aug. 31, 2008

(65) Prior Publication Data
US 2010/0056025 A1    Mar. 4, 2010

(51) Int. Cl.
*B27C 5/00* (2006.01)
*B23C 3/12* (2006.01)

(52) U.S. Cl. ........................... 409/140; 82/1.11

(58) Field of Classification Search ............. 407/29.13, 407/29.15; 82/1.11, 1.2, 1.3, 1.4, 1.5, 18, 82/11; 409/140, 138
See application file for complete search history.

(56) References Cited

U.S. PATENT DOCUMENTS

| | | | | |
|---|---|---|---|---|
| 1,889,013 | A * | 11/1932 | Berner | 470/209 |
| 3,217,382 | A * | 11/1965 | De Dobbelaere et al. | 407/29.13 |
| 3,289,717 | A * | 12/1966 | Dutot | 144/134.1 |
| 4,428,162 | A | 1/1984 | Feldt et al. | |
| 4,993,896 | A | 2/1991 | Dombrowski et al. | |
| 6,048,142 | A | 4/2000 | Hashimoto et al. | |
| 6,241,433 | B1 * | 6/2001 | Rydberg et al. | 408/233 |
| 6,354,347 | B1 | 3/2002 | Brewer | |
| 6,974,286 | B2 * | 12/2005 | Lawson | 409/140 |
| 2007/0104551 | A1 | 5/2007 | Gaiser | |

FOREIGN PATENT DOCUMENTS

| | | |
|---|---|---|
| EP | 0607608 | 7/1994 |
| JP | 60238210 | 11/1985 |
| JP | 2005040921 | 2/2005 |

OTHER PUBLICATIONS

ATI Radially-Compliant Robotic Deburing Tools Flexdeburr (Models 915-RC-300, -340, and-660) Installation and Operation Manual [online]. ATI Industrial Automation, 2006 [retrieved on Sep. 23, 2009]. Retrieved from the Internet: <URL: http://www.ati-ia.com/app_content/documents/9610-50-1007.pdf>. pp. 19-22.

* cited by examiner

*Primary Examiner*—Will Fridie, Jr.
(74) *Attorney, Agent, or Firm*—W. Scott Andes; Jonathan M. Hines; Trego, Hines & Ladenheim, PLLC (57) ABSTRACT

A rotary file includes: (a) a body having first and second ends, and an outer surface comprising at least one cutting edge; (b) a shank extending from the first end of the body which is adapted to be mounted in a rotary tool; and (c) a pilot extending from the second end of the body, the pilot defining an annular peripheral surface with an arcuate cross-section.

4 Claims, 11 Drawing Sheets

GUIDED ROTARY FILE

BACKGROUND OF THE INVENTION

This invention relates generally to machine tooling and more particularly to apparatus and methods for deburring operations.

Currently many machined features, such as those found on aircraft engine parts, are deburred manually. This leads to inconsistencies in the finished feature size and shape. With the introduction of requirements for stricter process control, highly stressed features require automated deburring processes to ensure consistency. Because of the difficulty machining aviation materials, many of these features come out of the primary machining operations with large burrs that must be removed with carbide cutters (e.g. rotary files). The difficulty with automating these processes is removing the burr without removing parent material. The burr size varies from part to part and the location of the feature can also vary making it impossible to program a specific toolpath to remove only the burr.

The state of the art for this application is to use an automated probe to determine the contours of the machined feature and then through adaptive machining morph an existing CNC toolpath to cause a deburring tool to follow the feature and remove the burr. Unfortunately this it is a very costly solution which requires additional maintenance support. It can also be very difficult at times to probe the feature without probing the burrs, causing errors in the toolpath.

BRIEF SUMMARY OF THE INVENTION

These and other shortcomings of the prior art are addressed by the present invention, which provides a rotary file having a guide pilot which permits deburring without complex programming procedures.

According to one aspect of the invention, a rotary file includes: (a) a body having first and second ends, and an outer surface comprising at least one cutting edge; (b) a shank extending from the first end of the body which is adapted to be mounted in a rotary tool; and (c) a pilot extending from the second end of the body, the pilot defining an annular peripheral surface with an arcuate cross-section.

According to another aspect of the invention, an apparatus is provided for removing one or more burrs from a peripheral edge of a machined feature in a workpiece, including: (a) a deburring tool having a rotatable spindle which is resiliently deflectable away from a nominal axis of rotation; (b) a rotary file, comprising: (i) a body having first and second ends, and an outer surface comprising at least one cutting edge; (ii) a shank extending from the first end of the body which is mounted in the spindle; and (iii) a pilot extending from the second end of the body, the pilot defining an annular peripheral surface with an arcuate cross-section.

According to another aspect of the invention, a method is provided for removing one or more burrs from a peripheral edge of a machined feature in a workpiece. The method includes: (a) providing a deburring tool having a rotatable spindle which is resiliently deflectable away from a nominal axis of rotation; (b) mounting a rotary file in the spindle, the rotary file comprising: (i) a body having first and second ends, and an outer surface comprising at least one cutting edge; (ii) a shank extending from the first end of the body which is mounted in the spindle; and (iii) a pilot extending from the second end of the body, the pilot defining an annular peripheral surface with an arcuate cross-section; and (c) spinning the rotary file while simultaneously traversing the rotary file along a preprogrammed toolpath, such that the pilot contacts a first portion of the workpiece while the body cuts the one or more burrs. The toolpath is programmed to maintain the spindle in a laterally deflected position throughout the deburring procedure

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
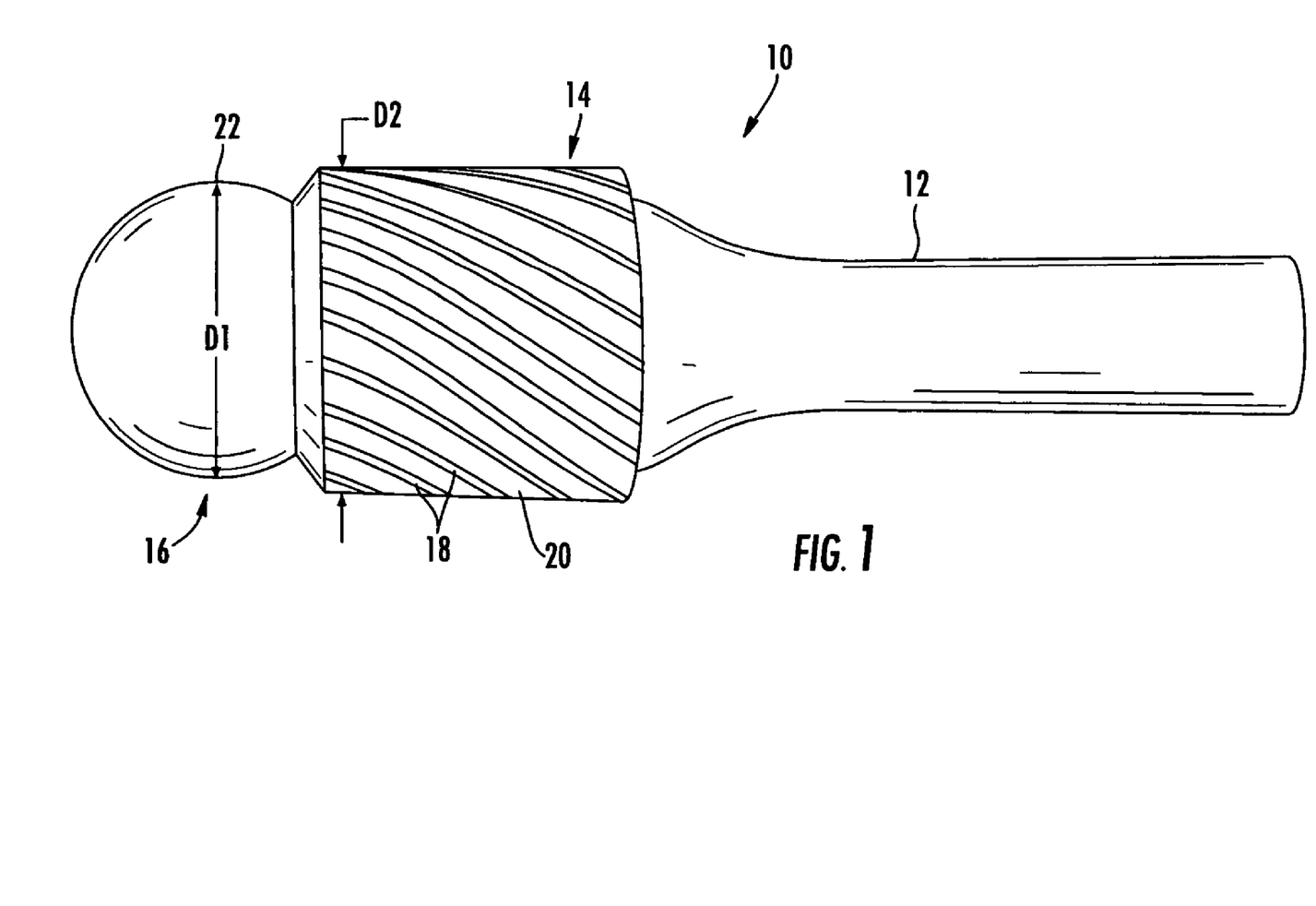
FIG. 1 is a side view of a rotary file constructed according to an aspect of the present invention.
Figure 2:
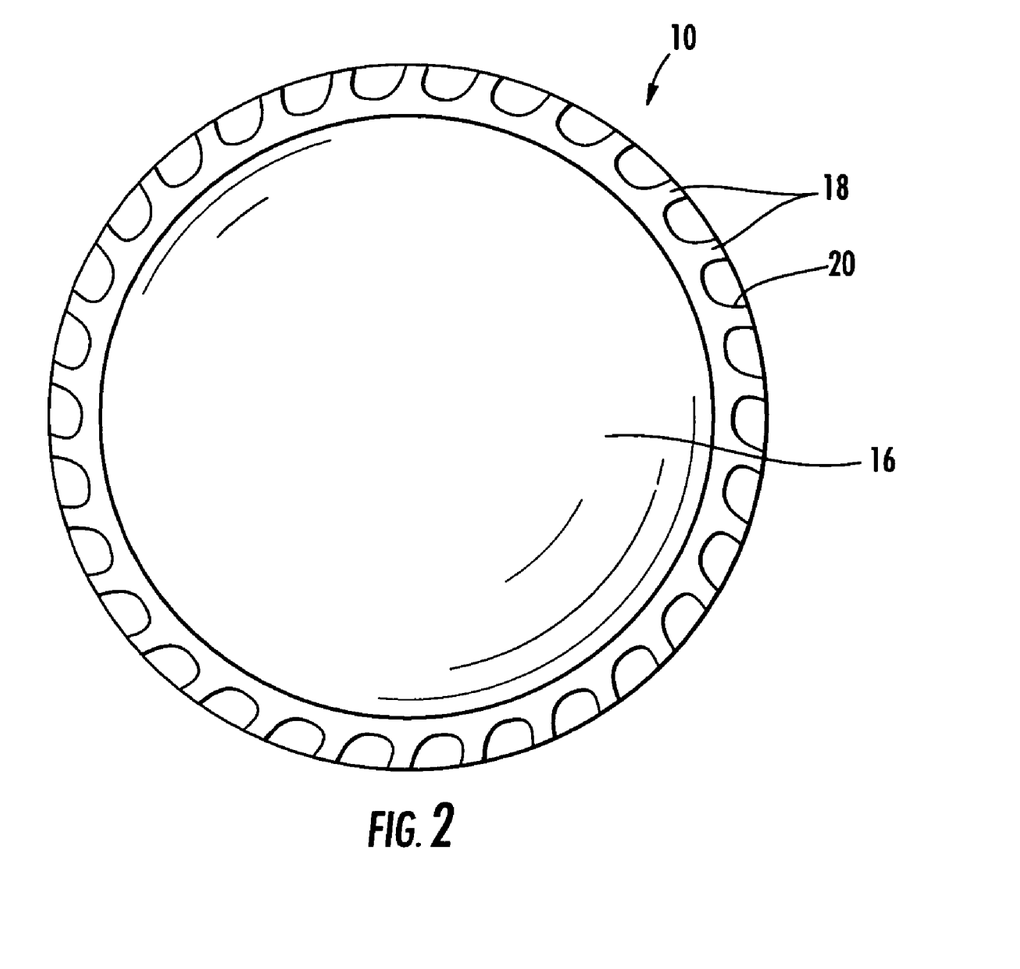
FIG. 2 is an end view of the rotary file of FIG. 1.

Referring to the drawings wherein identical reference numerals denote the same elements throughout the various views, FIGS. 1 and 2 depict a rotary file 10 constructed according to an aspect of the present invention. The rotary file 10 comprises a shank 12, a body 14, and a pilot 16. The rotary file 10 may be made from a number of known processes such as casting, forging, machining from billet stock, etc. Typically the rotary file 10 would be a single integral structure, but it could be built up, for example from components brazed or welded together. Nonlimiting examples of suitable materials for the rotary file 10 include tool steels, tungsten carbide, and the like.

The shank 12 may be cylindrical as shown, or may incorporate retention and/or drive features of a known type, such as a machine taper, threads, or one or more flats, facets, or tabs (not shown).

The body 14 includes an array of cutting lands 18 separated by flutes 20. In the illustrated example the cutting lands 18 have a conventional file tooth profile; however a different cutting profile or spacing may be used for the lands 18.

Figure 3:
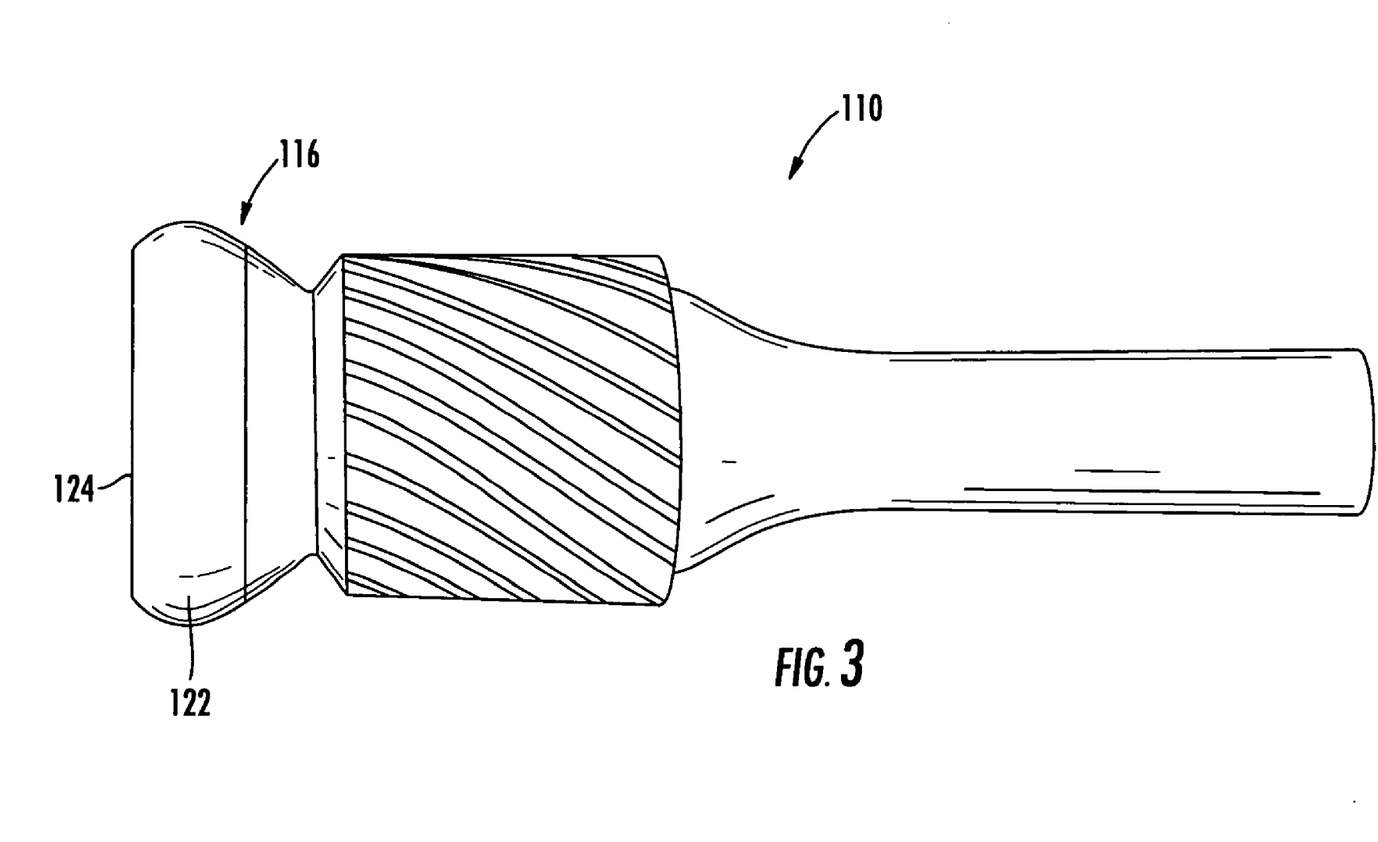
FIG. 3 is a side view of an alternative rotary file.

The pilot 16 includes at least one peripheral surface 22 with an arcuate cross-section. The purpose of the arcuate shape is to allow the rotary file 10 to contact a workpiece at various angles, as described in more detail below. In the example shown in FIG. 1, the peripheral surface 22 defines a nearly complete sphere which intersects the body 12. FIG. 3 illustrates an alternative rotary file 110 having a pilot 116 which has an annular peripheral surface 122 with an arcuate cross-section that is bounded by a flat end face 124.

Figure 4:
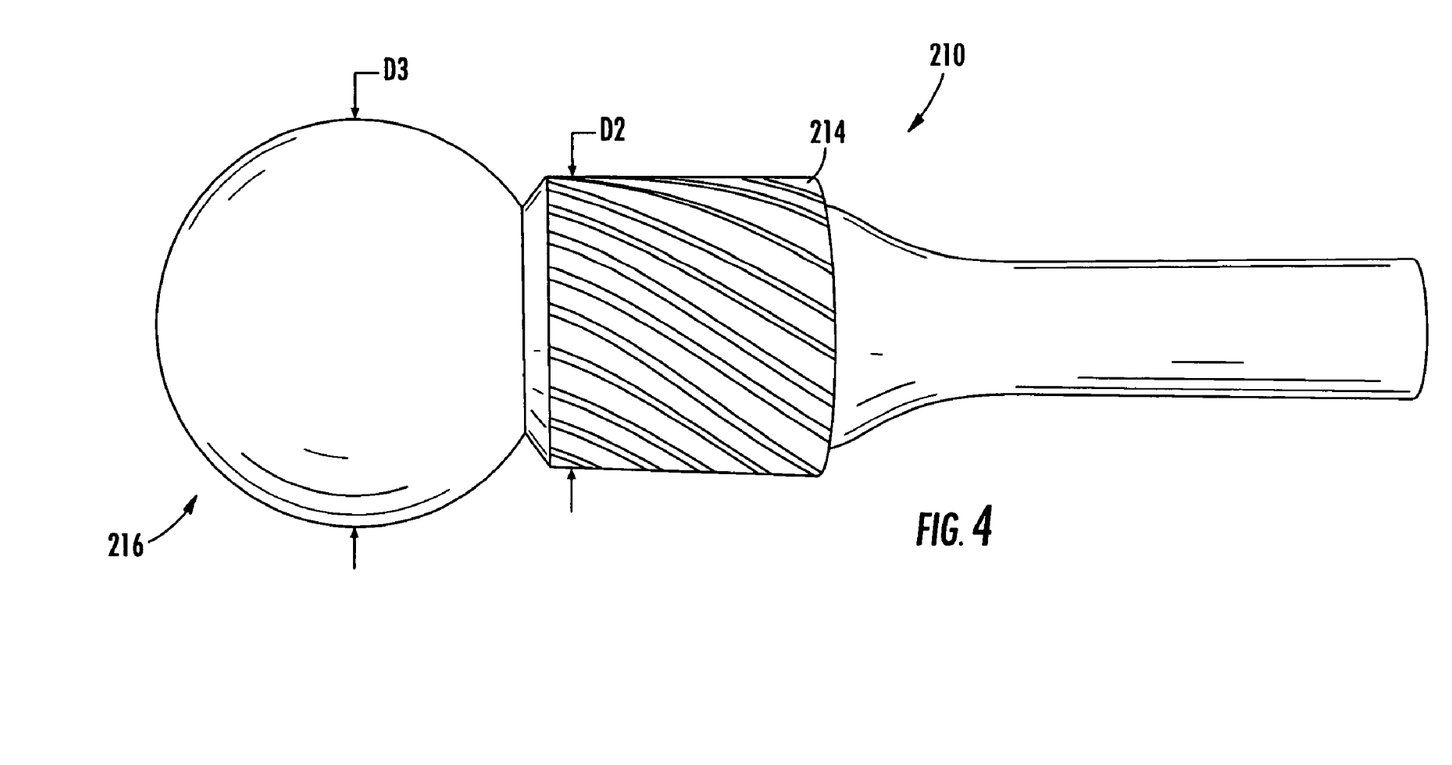
FIG. 4 is a side view of another alternative rotary file.

The dimensions of the pilot 16, in particular the overall diameter, may vary to suit a particular application. In FIG. 1 the pilot 16 is illustrated with a first outside diameter "D1" that is slightly less than the outside diameter "D2" of the body 14. FIG. 4 illustrates another rotary file 210 with a pilot 216 having a diameter "D3" that is greater than the diameter "D2" of the body 214.

Optionally, the pilot 16, or at least the peripheral surface 22, may incorporate an anti-friction surface. For example, it may be hardened and micropolished. Alternatively, an anti-friction coating such as polytetrafluorotheylene (PTFE), Titanium Nitride, Titanium Aluminum Nitride, Aluminum Nitride or other coatings applied to traditional metal cutting tools may be applied thereto.

Figure 5:
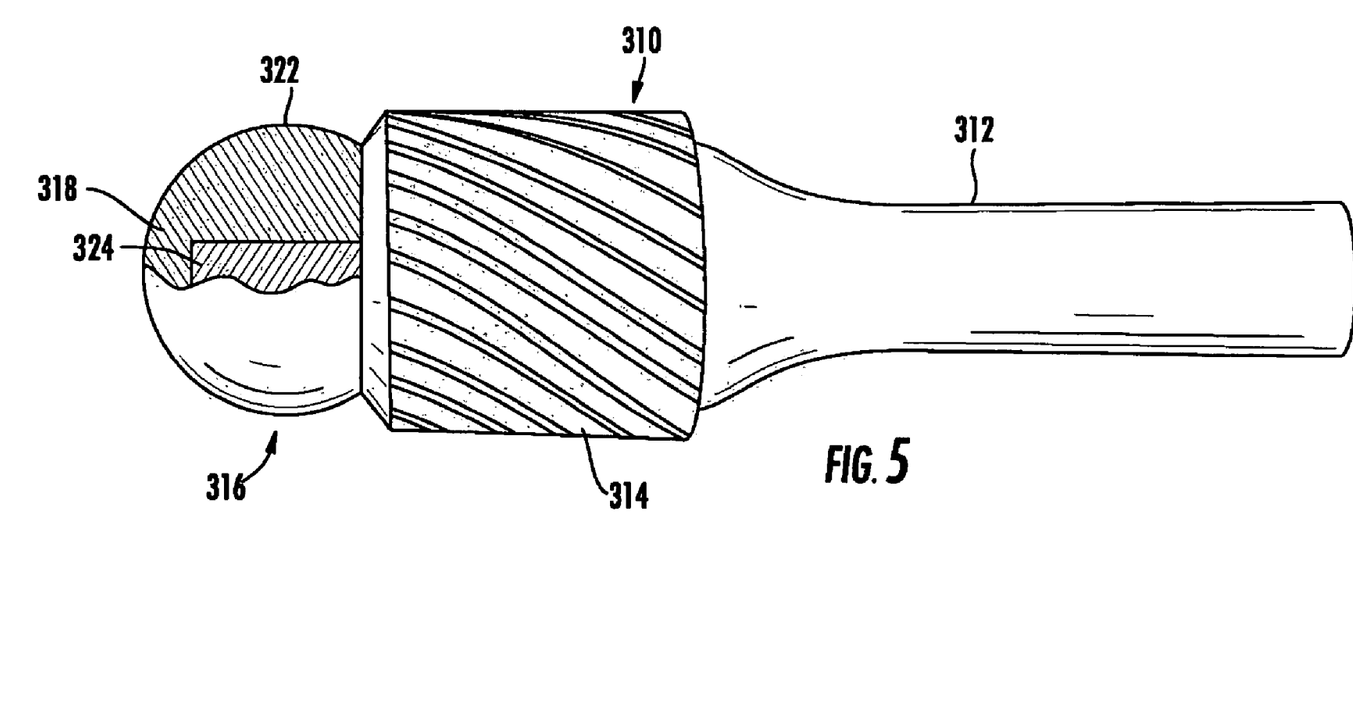
FIG. 5 is a side view of another alternative rotary file.

The pilot may comprise a separate element that is attached to the body of the rotary file. For example, FIG. 5 illustrates an alternative rotary file 310 having a pilot 316, shank 312, and body 314. The pilot 316 includes a pilot body 318 defining an annular peripheral surface 322 as described above. The pilot body 318 is secured to a stud 324 that protrudes from the body 314, for example by a friction or shrink fit, or with an adhesive or a threaded fastener. The pilot body 318 may be constructed from a material that is low friction and is not likely to mar a metallic workpiece, such as hard rubber or plastic. This two-piece construction method may also be used so as to increase the producability of the tool.

Figure 6:
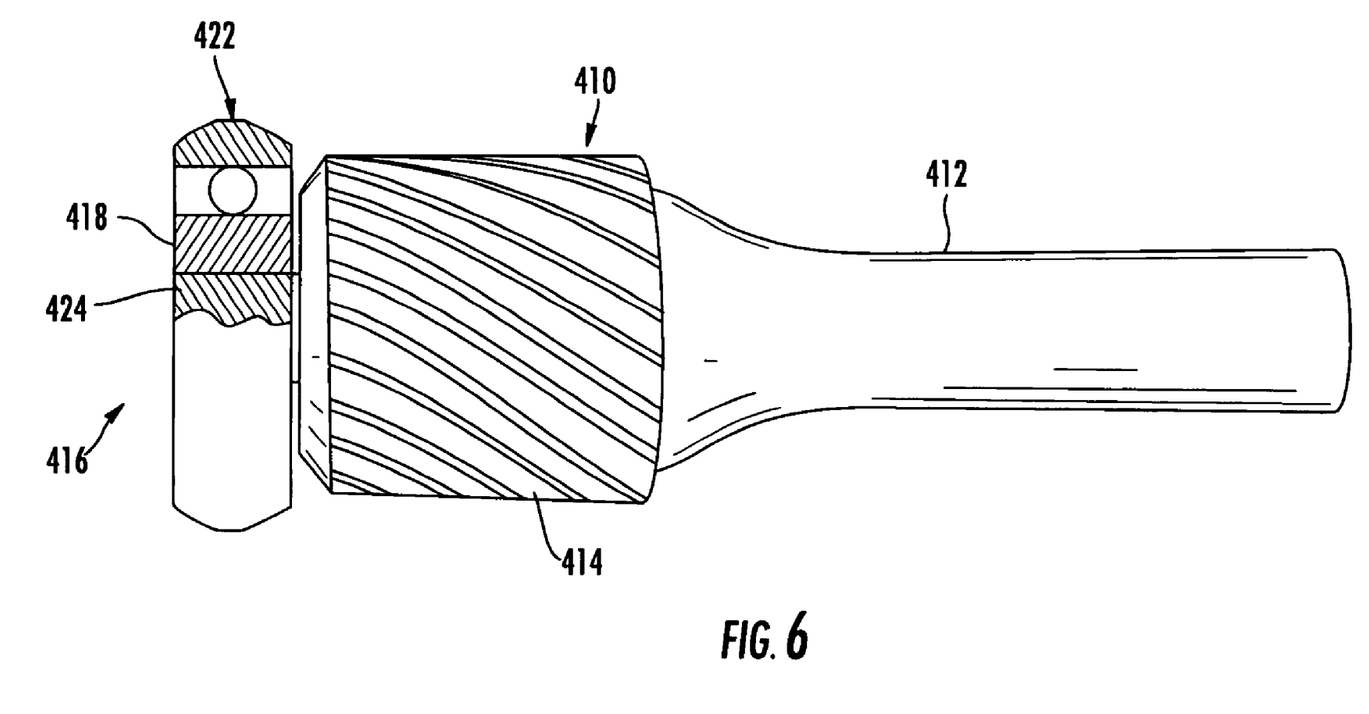
FIG. 6 is a side view of yet another alternative rotary file.

As another example of a separate pilot construction, FIG. 6 illustrates an alternative rotary file 410 having a pilot 416, shank 412, and body 414. The pilot 416 comprises a bearing 418 whose outer race defines an annular peripheral surface 422 as described above. The bearing 418 is secured to a stud 424 that protrudes from the body 414, for example by a friction or shrink fit, or with an adhesive or threaded fastener. In the illustrated example the bearing 422 is of a conventional rolling-element type.

Figure 7:
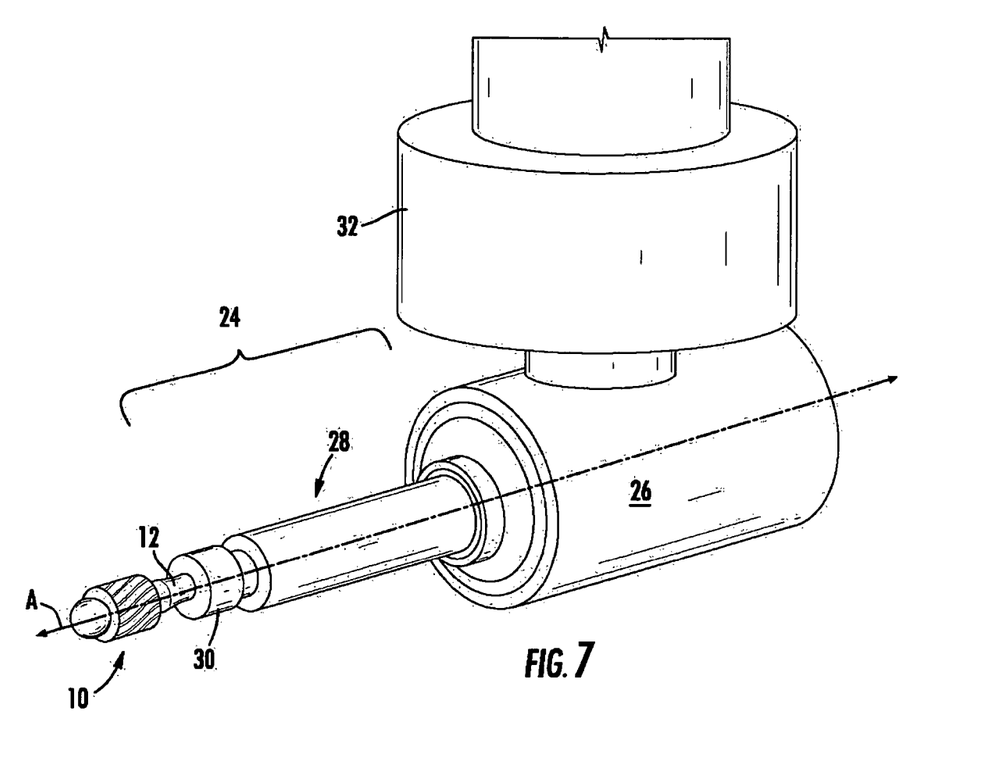
FIG. 7 is a perspective view of a deburring tool with a guided rotary file loaded therein.

As shown in FIG. 7, the rotary file 10 may be used in conjunction with a conventional deburring tool 24 comprising a rotary motor 26 (in this case, an air motor) having a compliant rotary spindle 28 with a collet 30 that receives the shank 12 of the rotary file 10. The deburring tool 24 is carried by a manipulator arm 32 which is part of an industrial robot of a known type, or by another suitable positioning mechanism. While not illustrated in detail, it will be understood that the manipulator arm 32 is equipped to move, i.e. translate and/or rotate, the deburring tool 24 through multiple degrees of freedom so as to cause the spindle 28 to follow a pre-programmed toolpath.

The spindle 28 is "radially compliant." In other words, the spindle 28 is supported so it can pivot away from a nominal rotational axis A of the rotary motor 26 to which it is attached, when a radially-directed force or "side force" is applied thereto. A restoring force is provided to urge the spindle 28 towards the nominal or centered position when no side force is applied.

One example of a suitable deburring tool 24 is a model RC FLEXDEBURR device available from ATI Industrial Automation, Apex, N.C. 27539, USA. In this particular device, the restoring force is provided by a pneumatically operated mechanism. For example when about 1.0-4.1 bar (15-60 psi) is provided to the deburring tool 24, the resulting restoring force will be about 12.7-42 N (2.8-9.5 lbs.), measured at the collet 30. In operation, the restoring force of the spindle 28 will be varied to suit a particular application. The restoring force is set to a value which is high enough such that any burrs or chips will be effectively machined away from a workpiece feature. If the restoring force is too low, the rotary file 10 will tend to "ride over" those features rather than cutting them away.

Figure 8:
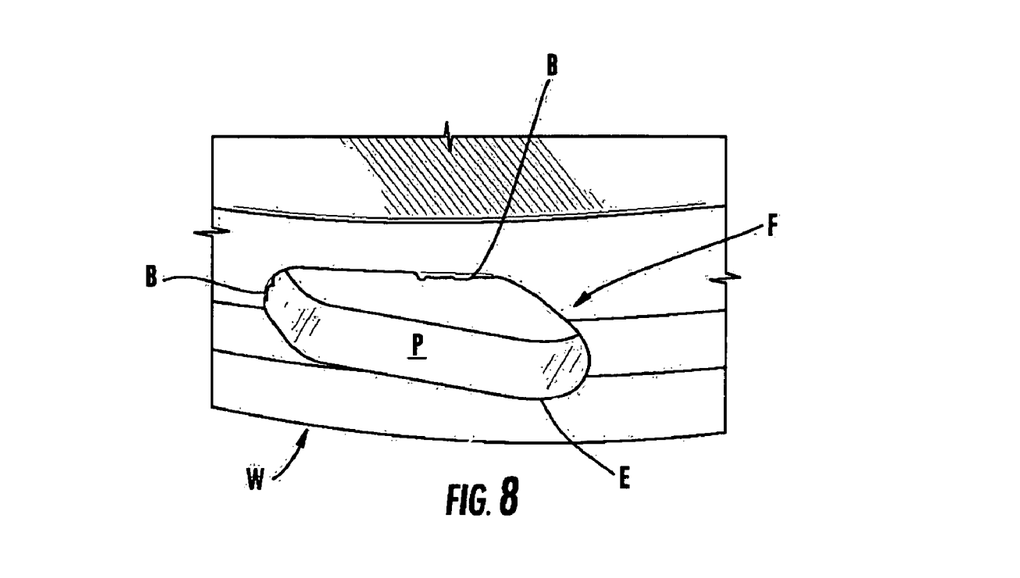
FIG. 8 is a perspective view of a workpiece with a feature machined therein before a deburring operation.

FIG. 8 shows a portion of a workpiece W, having a feature F machined therein, such as a slot or groove. The feature has a peripheral wall "P" that intersects the outer surface of the workpiece W at a peripheral edge "E". One or more burrs B extend from the peripheral edge E. These burrs B are a natural consequence of known machining processes.

Figure 9:
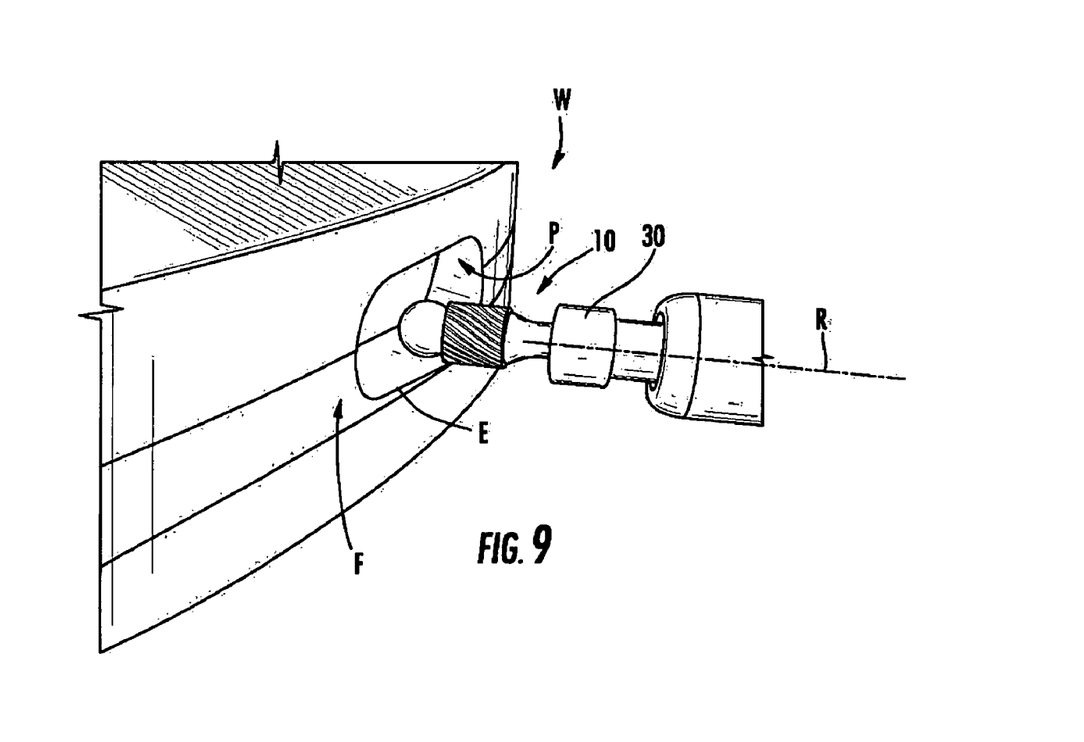
FIG. 9 is a perspective view of the workpiece of FIG. 6 with a rotary file performing a deburring operation thereon.
Figure 10:
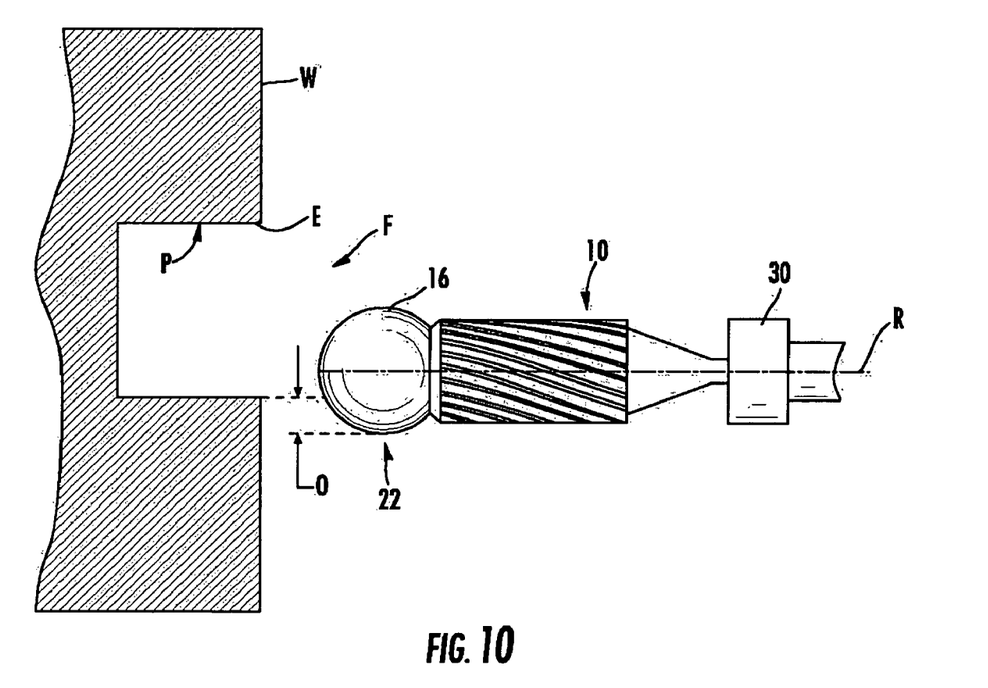
FIG. 10 is a cross-sectional view of a workpiece with a rotary file adjacent thereto.
Figure 11:
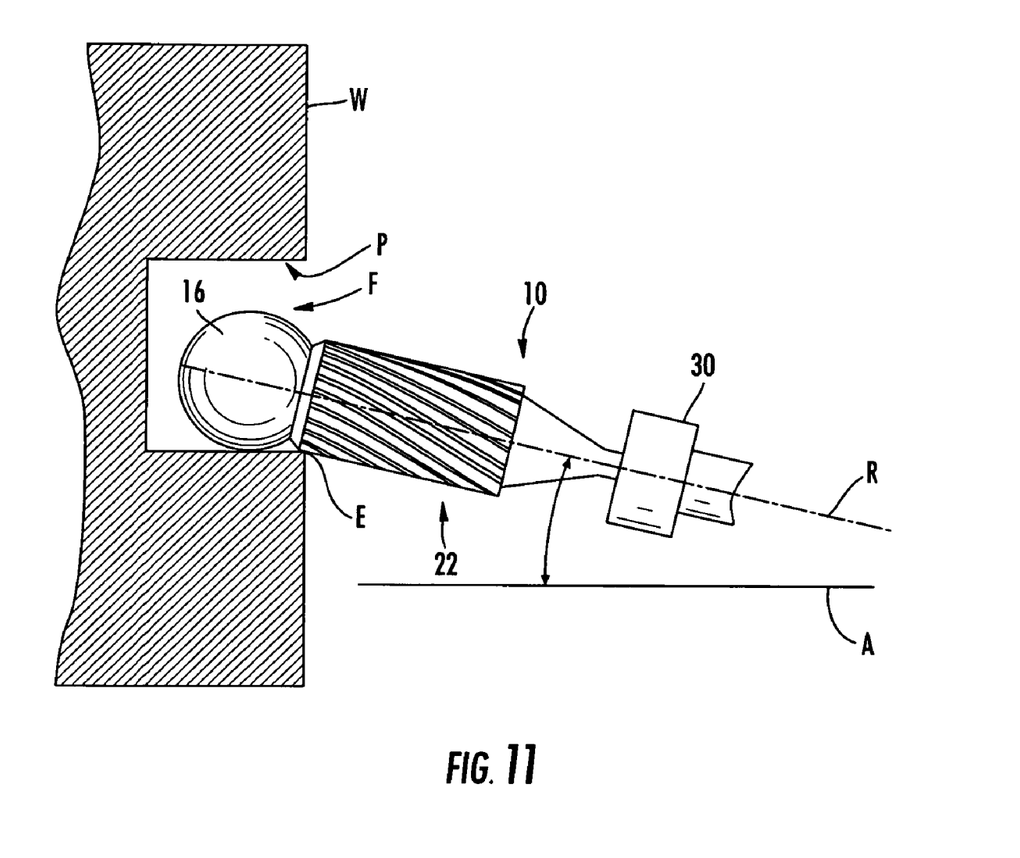
FIG. 11 is a cross-sectional view of a workpiece with a rotary file engaged therewith.
Figure 12:
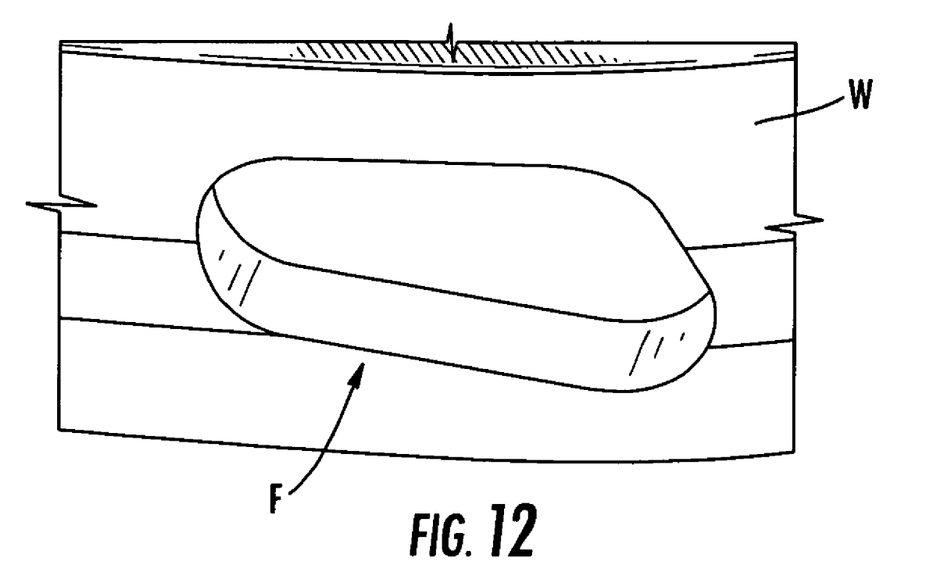
FIG. 12 is a perspective view of the workpiece of FIG. 8 after the completion of the deburring operation.

FIG. 9 shows the rotary file 10 in operation, removing a burr from the feature F in the workpiece W. The spindle 28 is rotated at high speed (for example about 30,000 RPM) and moved, i.e. translated in a direction lateral to the rotational axis R of the spindle 28, in a programmed toolpath. The programmed toolpath is based on the nominal geometry of the feature F, and generally follows the peripheral wall P. It is independent of the specific geometry of the burrs B (which is unknown). The toolpath first causes the rotary file 10 to enter the open portion of the feature F. Then, as shown in FIG. 10, the toolpath positions the rotary file 10 with a fixed amount of lateral interference or offset, denoted "O", from the peripheral surface P to the peripheral surface 22 of the pilot 16. The amount of offset "O" is selected to be large enough to ensure constant contact of the pilot 16 with the peripheral surface P. One example of a suitable offset dimension O, when using a rotary file 10 with a body 12 having an outside diameter of about 9.53 mm (0.375 in.), is about 3.18 mm (0.125 in.) to about 6.25 mm (0.25 in). With the programmed offset O, the toolpath causes the spindle 28 to be in a deflected or compliant position during the entire time the deburring process is taking place, as shown in FIG. 11. The contact between the pilot 16 and the peripheral surface P prevents the rotary file 10 from cutting deeper into the workpiece W, the result being that only the burrs B are removed. FIG. 12 shows the finished workpiece W.

Optionally, the rotary file 10 may be used to machine a "prebreak" or chamfer into the peripheral edge E, as well as removing burrs B. This may be done by deflecting or angling the rotary file 10 more in relation to the workpiece than would be the case for a pure deburring operation. This process may be accommodated by making the pilot diameter substantially larger than that of the body, as shown in FIG. 4. The larger pilot allows the deflection to be made without the edge of the flutes cutting a counterbore instead of a chamfer.

Using the rotary file 10 and the process described above, workpieces W can deburred consistently. This allows a toolpath to be programmed with reference to individual machined features to remove burrs without fear of overmachining or leaving some of the burr behind. Accordingly, the consistency of an automated process is achieved without requiring excessive time in probing and setup procedures.

The foregoing has described a rotary file and a method for its use. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A method of removing one or more burrs from a peripheral edge of a machined feature in a workpiece, comprising:
   (a) providing a deburring tool having a rotatable spindle which is resiliently deflectable away from a nominal axis of rotation;
   (b) mounting a rotary file in the spindle, the rotary file comprising:
      (i) a body having first and second ends, and an outer surface comprising at least one cutting edge;
      (ii) a shank extending from the first end of the body which is mounted in the spindle; and (iii) a pilot extending from the second end of the body, the pilot defining an annular peripheral surface having an arcuate cross-section as viewed in a cutting plane parallel to a rotational axis of the rotary file; and
(c) spinning the rotary file while simultaneously traversing the rotary file along a preprogrammed toolpath which describes a preselected amount of interference between the rotary file and the workpiece, such that the pilot contacts a first portion of the workpiece while the at least one cutting edge cuts the one or more burrs;
(d) wherein the toolpath is programmed to continuously maintain the spindle in position deflected away from the nominal axis of rotation throughout the deburring procedure.

2. The method of claim 1 wherein a restoring force is applied to the spindle urging the spindle towards a nominal position, the restoring force being of sufficient magnitude to ensure removal of the largest observed burr from the peripheral edge.

3. The method of claim 1 wherein the tool is moved so as to machine a chamfer on the peripheral edge.

4. The method of claim 1 wherein the toolpath is programmed solely with reference to a nominal shape of the machined feature.

* * * * *